US012806546B2

(12) United States Patent
Korathu-Larson

(10) Patent No.: US 12,806,546 B2
(45) Date of Patent: Nov. 24, 2026

(54) FLUIDIZED BED SORTER

(71) Applicant: Rory Korathu-Larson, LLC, Seattle, WA (US)

(72) Inventor: Rory Korathu-Larson, Seattle, WA (US)

(73) Assignee: Rory Korathu-Larson LLC, Seattle, WA (US)

( * ) Notice: Subject to any disclaimer, the term of this patent is extended or adjusted under 35 U.S.C. 154(b) by 403 days.

(21) Appl. No.: 18/386,974

(22) Filed: Nov. 3, 2023

(65) Prior Publication Data

US 2024/0149190 A1 May 9, 2024

Related U.S. Application Data

(60) Provisional application No. 63/422,328, filed on Nov. 3, 2022.

(51) Int. Cl.
*B01D 24/24* (2006.01)
*B01D 24/36* (2006.01)
*B01D 24/46* (2006.01)

(52) U.S. Cl.
CPC ............. *B01D 24/24* (2013.01); *B01D 24/36* (2013.01); *B01D 24/461* (2013.01); *B01D 24/4689* (2013.01)

(58) Field of Classification Search
CPC ...... B01D 24/24; B01D 24/36; B01D 24/461; B01D 24/4689; B01D 24/20; B01D 24/205; B01D 24/22; B01D 24/4631; B01D 24/4636; B03B 5/00; B03B 5/48; B29B 17/02; B29B 2017/0203; B29B 2017/0213; B29B 2017/0224
See application file for complete search history.

(56) References Cited

U.S. PATENT DOCUMENTS 2,092,716 A * 9/1937 Hungerford ............. B01J 49/06 210/283
3,444,996 A * 5/1969 Walsh ........................ B03B 5/46 209/466
3,623,978 A * 11/1971 Boze ....................... B01D 37/03 210/732
3,674,144 A * 7/1972 Muller ..................... B03B 4/005 209/475
3,892,044 A * 7/1975 Kayatz ................ F27D 15/0213 209/44
4,793,934 A * 12/1988 Thompson ............. B01D 37/04 210/793

(Continued)

*Primary Examiner* — Joseph W Drodge
(74) *Attorney, Agent, or Firm* — Timothy John Billick; Robert Roth

(57) ABSTRACT

A sorter for sorting a mixture having at least a first material with a first density from a second material with a second density different than the first density, comprising a container adapted to receive the mixture, a bed forming a base of the container provided with a series of openings extending from a bottom of the base to a top of the base, a granular layer positioned on the bed, and an air supply line providing air to the openings. In operation, the mixture is positioned above the granular layer, and the air supply supplies air to the granular layer at a rate sufficient to allow the sorting of the first material into a separate portion of the container from the second material.

5 Claims, 3 Drawing Sheets

(56) References Cited

U.S. PATENT DOCUMENTS

| | | | | | |
|---|---|---|---|---|---|
| 5,988,395 | A * | 11/1999 | Calo | B03B 5/623 209/4 |
| 6,261,453 | B1 * | 7/2001 | Savage | B01D 24/4631 210/293 |
| 8,871,093 | B2 * | 10/2014 | Ball | B01D 24/24 210/275 |
| 8,889,015 | B2 * | 11/2014 | Roberts | B01D 24/4631 210/795 |
| 2007/0023346 | A1 * | 2/2007 | Roberts | B01D 24/008 210/293 |
| 2012/0111777 | A1 * | 5/2012 | Roberts | B01D 24/4626 210/232 |

* cited by examiner

FLUIDIZED BED SORTER

This patent application claims priority benefit of U.S. provisional patent application 63/422,328, filed on Nov. 3, 2022.

FIELD OF THE INVENTION

This invention relates to sorters, and more particularly to a fluidized bed sorter, also known as Fluidized Air Density Separation ("FADS") of waste streams such as plastics.

BACKGROUND OF THE INVENTION

Mixtures such as waste streams comprise a wide variety of materials. For example, multiple types of plastics may be present in the same waste stream. It would be desirable to separate out such plastics from one another so that they can be recycled, or at least downcycled. Downcycling occurs when plastics are recycled, but the properties of the plastics decline, such as the strength of the plastic gets weaker. In any case, downcycling makes it possible to still put the recycled materials to good use. A common example of the downcycling process includes transforming plastic bottles into carpeting or fleece fibers and later turning fleece and carpeting materials into plastic lumber products. Thus, it is advantageous to sort plastics from a waste stream even if full recycling is not available.

It would therefore be desirable to provide a sorter of waste streams of different materials in a simple and low-cost manner.

SUMMARY OF THE INVENTION

In accordance with a first aspect, a fluidized bed sorter for sorting a mixture having at least a first material with a first density from a second material with a second density different than the first density, comprising a container adapted to receive the mixture, a bed forming a base of the container provided with a series of openings extending from a bottom of the base to a top of the base, a granular layer positioned on the bed, and an air supply line providing air to the openings from underneath the bed. In operation, the mixture may comprise of a collection of one or more types of plastics. In operation, the mixture is positioned above the granular layer, and the air supply supplies air to the granular layer at a rate sufficient to allow the sorting of the first material into a separate portion of the container from the second material.

From the foregoing disclosure and the following more detailed description of various embodiments, it will be apparent to those skilled in the art that the present invention provides a significant advance in the technology of sorters. Particularly significant in this regard is the potential the invention affords for providing a reliable, dependable, and easy-to-use sorter for separating materials in waste streams using density. Additional elements and advantages of various embodiments will be better understood in view of the detailed description provided below.

Figure 1:
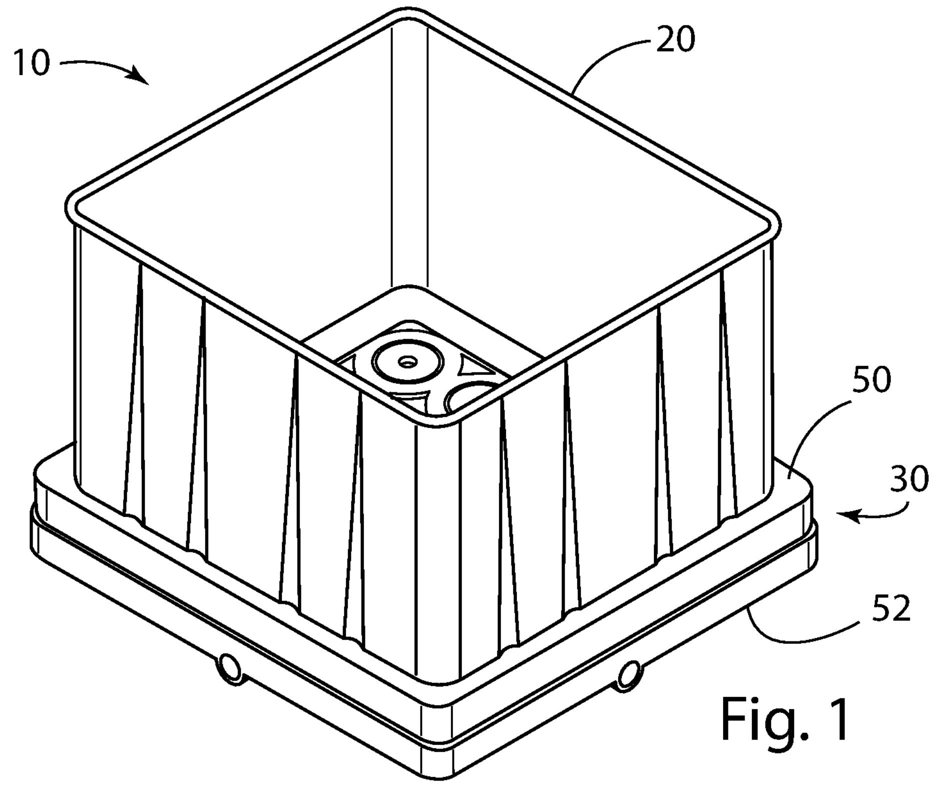
FIG. 1 is a schematic isometric view of a sorter in accordance with one embodiment.

It should be understood that the appended drawings are not necessarily to scale, presenting a somewhat simplified representation of various features illustrative of the basic principles of the invention. The specific design features of the sorter as disclosed here, including, for example, the specific dimensions of the sorter table will be determined in part by the particular intended application and use environment. Certain features of the illustrated embodiments have been enlarged or distorted relative to others to help provide a clear understanding. In particular, thin features may be thickened, for example, for clarity of illustration. All references to direction and position, unless otherwise indicated, refer to the orientation illustrated in the drawings.

DETAILED DESCRIPTION OF CERTAIN EMBODIMENTS

It will be apparent to those skilled in the art that many uses and design variations are possible for the sorter disclosed here. The following detailed discussion of various alternate elements and embodiments will illustrate the general principles of the invention with reference to a sorter table suitable for use in separating materials, especially plastics, by density.

Turning now to the drawings, FIG. 1 shows a simplified isometric view of one embodiment of a fluidized bed sorter 10 having a container or box 20, a table or pan 30. A relatively fine and uniform granular layer 60 such as sand is positioned over the pan 30 and seen in FIG. 2. The granular layer 60 may form a fluidized bed to receive a mixture of materials 70 as shown in a top-down view in FIG. 3 to be sorted on as described in greater detail below. The granular material forms a fluidized bed which is understood here to mean that the granular layer 60 is a nearly non-Newtonian fluid, which is a fluid with near constant viscosity, and with low shear rate at zero shear stress, that is, the shear rate is nearly directly proportional to the shear stress. The mixture of materials 70, such as waste, can be added to container 20 on top of the granular layer. The mixture of materials 70 can comprise many different materials, especially different types of plastics. This mixture of materials 70 typically would comprise at least a first material 71 having a first density, and a second material 72 having a second density different than the first density, and typically comprises more materials. The process for pre-screening the materials (such as cleaning and reducing to a relatively uniform size, e.g., pellets) is described in greater detail below. Typically, when the materials 70 arrive at the fluidized bed sorter they have been cleaned and pre-sorted to remove impurities and enhance separation efficiency.

Figure 2:
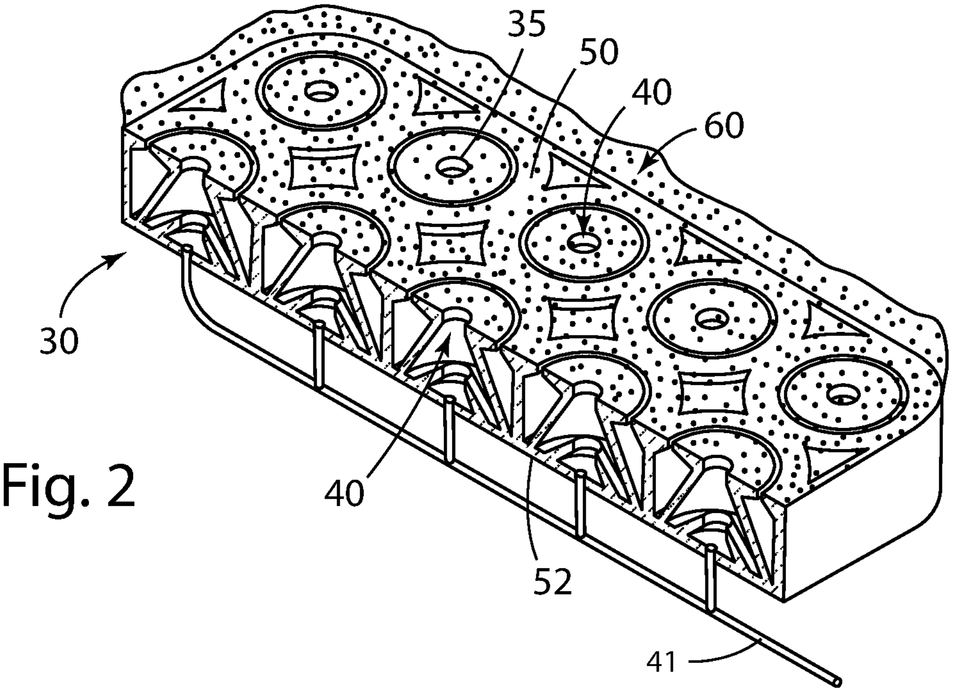
FIG. 2 is an isolated isometric view of a sorting table for the sorter of FIG. 1 with a section cut away.

FIG. 2 shows a cross-section view of the table 30, having a top surface 50 and a bottom surface 52. The table 30 forms a base that cooperates with the container to hold the granular layer 60 and the mixture of materials 70. The granular layer 60 is positioned immediately above a top surface 50 of the table 30 and the materials are positioned immediately on top of the granular layer 60. The granular layer 60 can comprise sand, for example. The table 30 is provided with a plurality of openings 35 at the top surface 50 and at least one air channel 40 extends through the top surface 50 of table 30 to the bottom of table 52. As shown in FIG. 2, the at least one air channel 40 may narrow as the air channel extends from the bottom surface 52 to the top surface 50, with at least one top opening 35 narrower (having a smaller diameter) than the rest of the corresponding air channel 40. An air supply line 41 may be routed to the bottom surface 52 of the table 30 and connect at one or more air channels 40 to provide a stream of air to blow against the granular layer 60.

The fluidized bed sorter 10 preferentially sorts materials by density into distinct regions. That is, the air supply supplies air to the granular layer 60 at a rate sufficient to allow the sorting of the first material into a separate portion of the container 20 from the second material (without blowing the granular material or the other materials out of the container). These distinct regions of separated/segregated materials in different portions of the container can be collected with a scraper (not shown), for example. For example, the scraper can collect the first material 71 after the first material has been sorted from the mixture. Optionally, an unloading mechanism (not shown) for removal of the remaining stream of materials left behind after separation with the scraper may be provided. This remainder may be disposed of separately.

Figure 3:
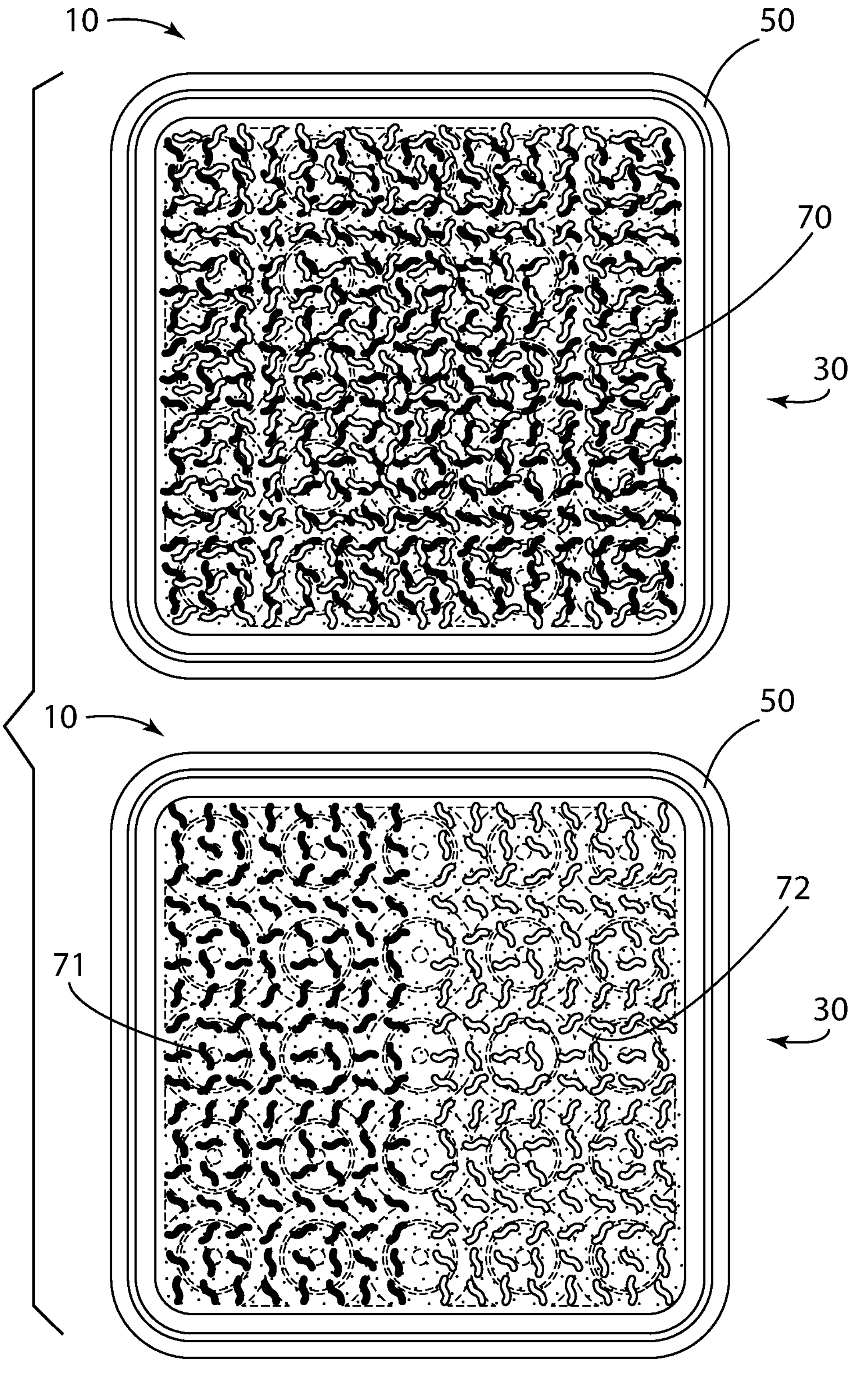
FIG. 3 is a top-down view of the sorter in FIG. 1 in accordance with one embodiment.

FIG. 3, as noted above, shows a top down Before (top of the page) and After (bottom of the page) views showing the sorting process. For ease of illustration the process is simplified to show just a mixture 70 formed by a pair of materials such as a first plastic 71 and a second plastic 72, each having a different density. The sorter 10 has table 30 and the table has the granular material 60, here sand. In the Before image the two plastics are a mixture 70. In the After image, as a result of blowing air against the sand, the two materials 71 and 72 sort into rows of generally uniform density, and each row may be removed with a scraper of other similar device.

Figure 4:
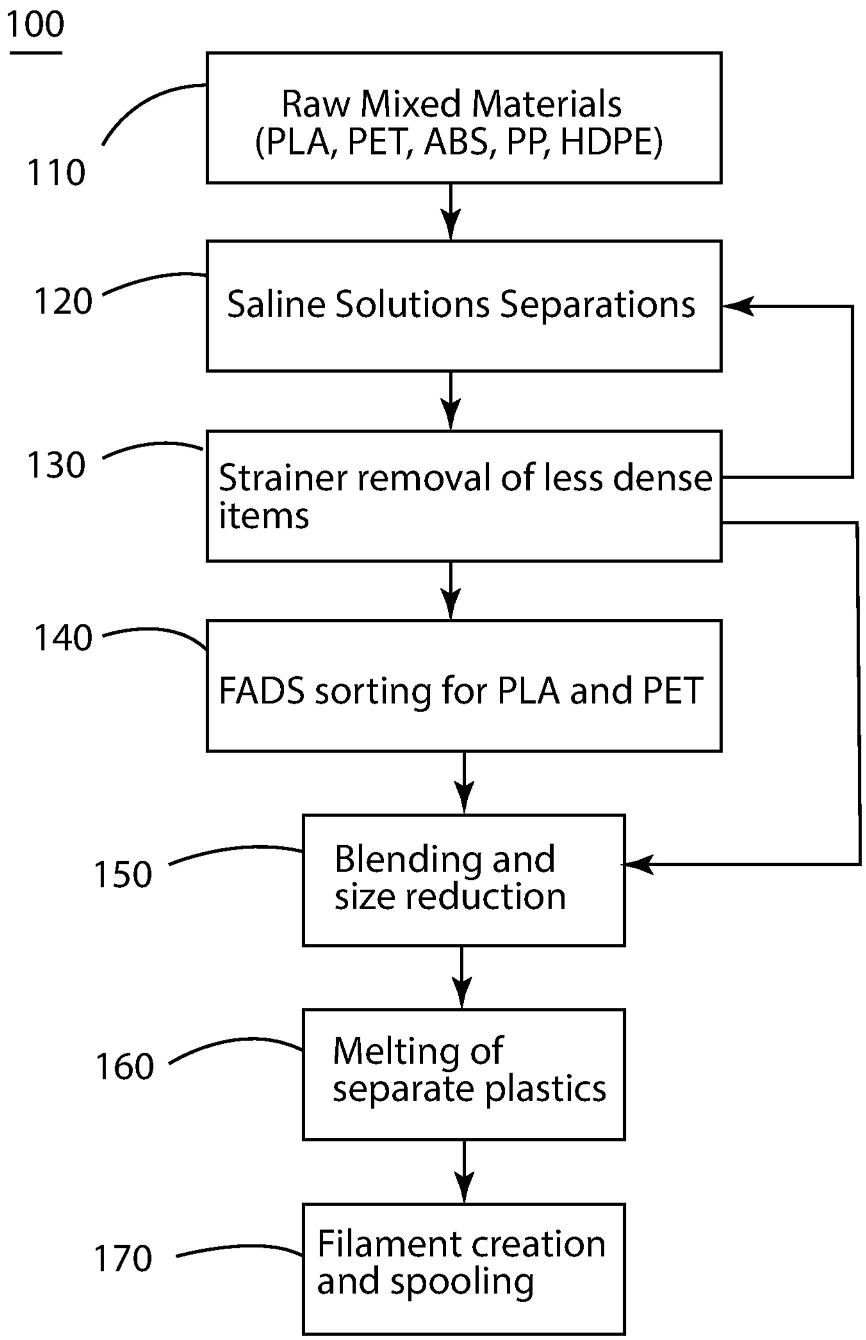
FIG. 4 is a flow chart showing a representative example of a process for separating a stream of materials.

FIG. 4 shows a representative process 100 for segregating/sorting materials of different densities in a mixture in accordance with one embodiment. A collection of raw materials (which can comprise plastics such as polylactic acids (PLA), polyethylene terephthalates (PET), acrylonitrile butadiene styrenes (ABS), polypropylenes (PP), ad high density polyethylenes (HDPE), for example) are mixed together at step 110 and typically introduced into a conveyor belt type assembly. The materials may be pre-sorted prior to introduction into the fluidized bed sorter. For example, at step 120 the mixture is washed to remove non-plastics, dirt, debris, etc. Step 130 follows with a removal of less dense materials such as paper. These can be strained from the mixture at this point. Washing and straining steps may be repeated if needed, for example by not passing an optical inspection test. At step 140 the fluidized bed sorter/fluidized air density separator FADS 10 may be used to separate cleaned plastics by density difference. Optionally the various plastics form rows such that a scraper or other similar device can collect and isolate a particular selection of material all having substantially the same density. Once sorted, the set of plastic forming the first material may be routed for blending and size reduction at step 150. The sizes may be reduced to the size of flakes or pellets. A series of stations, each with its own FADS 10 with a corresponding scraper may be used for high-volume operations.

Optionally lightweight plastics removed at the strainer step 130 may be joined together with other sorted plastics (typically other low-density plastics), blended together, and shredded at step 150. Once combined into a preferred grouping, the sorted subset of separated plastics of near uniform density may be melted at step 160. Next, the molten plastic may be routed to a filament creator for the creation of (typically recycled) filaments, cooled and spooled.

From the foregoing disclosure and detailed description of certain embodiments, it will be apparent that various modifications, additions, and other alternative embodiments are possible without departing from the true scope of the invention. The embodiments discussed were chosen and described to provide the best illustration of the principles of the invention and its practical application to thereby enable one of ordinary skill in the art to use the invention in various embodiments and with various modifications as are suited to the particular use contemplated. An such modifications and variations are within the scope of the invention as determined by the appended claims when interpreted in accordance with the breadth to which they are fairly, legally, and equitably entitled.

What is claimed is:

1. A sorter for sorting a mixture having at least a first material with a first density from a second material with a second density different than the first density, comprising, in combination:

- a container adapted to receive the mixture;
- a table forming a base of the container provided with a series of openings extending from a bottom of the base to a top of the base, wherein each of the series of openings is narrower at the top of the base than at the bottom of the base;
- a granular layer positioned on the base; and
- an air supply line providing air to at least one of the openings;
- wherein in operation the mixture is positioned above the granular layer, and the air supply supplies air to the granular layer at a rate sufficient to allow sorting of the first material into a separate portion of the container from the second material, and sorting occurs above the granular layer.

2. The sorter of claim 1 wherein the container has four walls extending from the base, with such that the base cooperates with the container to hold the granular layer and the mixture.

3. The sorter of claim 1 wherein the granular layer is sand and the sand acts as a fluidized layer when air is supplied to the sand.

4. The sorter of claim 1 further comprising a scraper adapted to collect the first material after the first material has been sorted from the mixture.

5. The sorter of claim 1 wherein the first material and the second material cannot pass below the bottom of the base.

* * * * *